Oct. 29, 1940.  C. E. PARKER  2,219,787
COOK STOVE
Filed Dec. 11, 1937   2 Sheets-Sheet 1
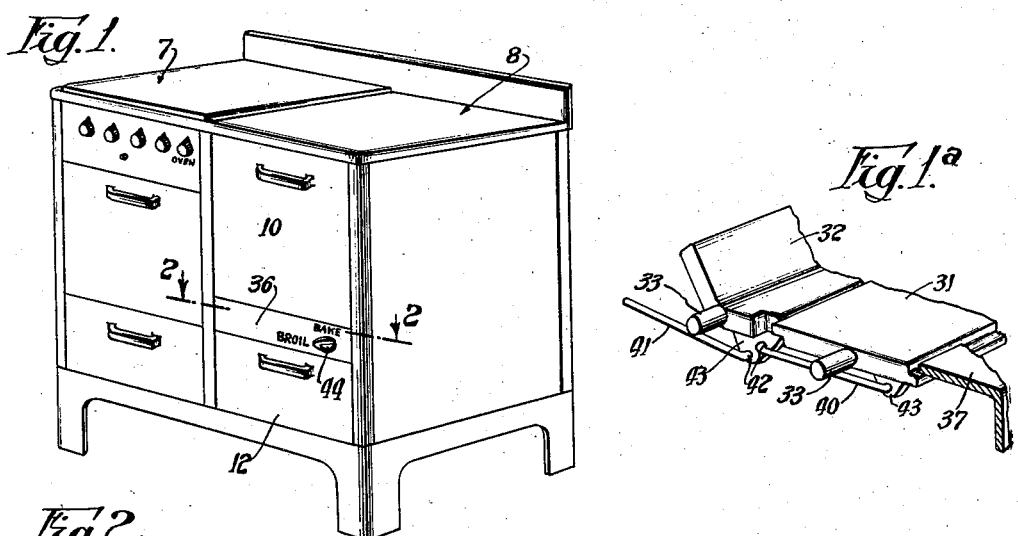
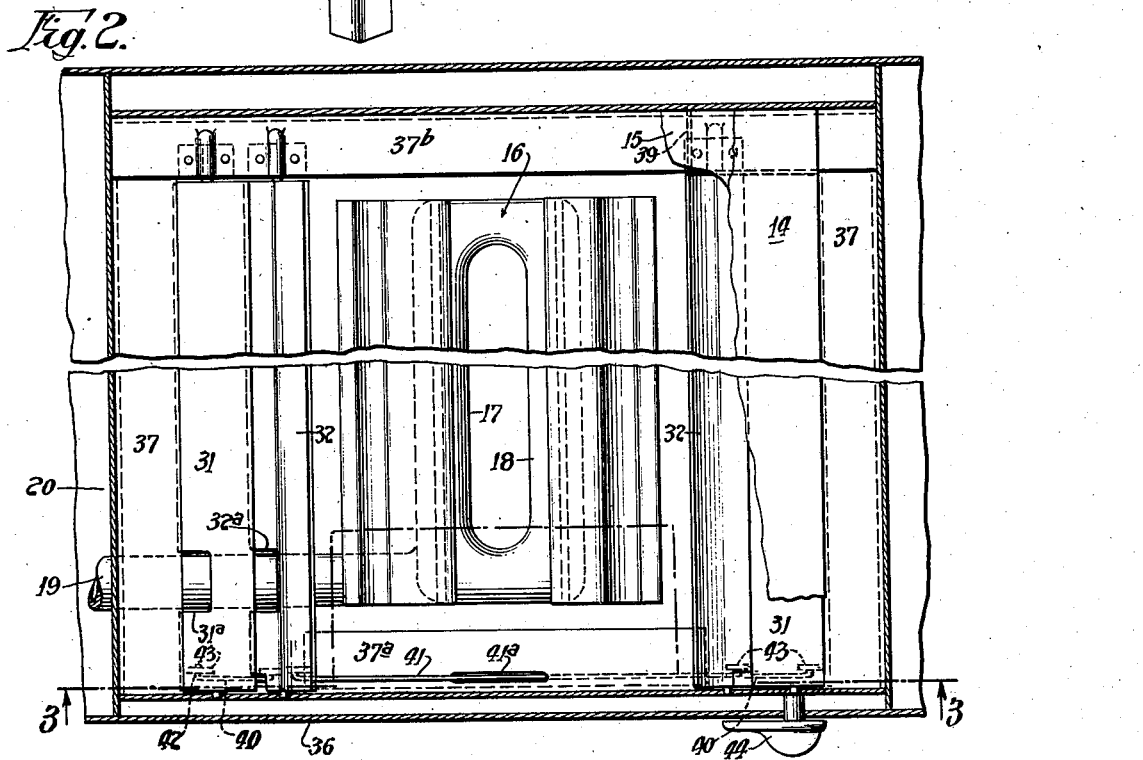
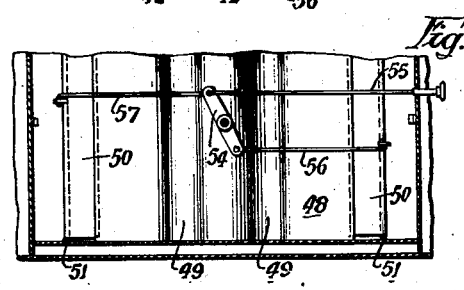
Inventor:
Claude E. Parker, Oct. 29, 1940.   C. E. PARKER   2,219,787
COOK STOVE
Filed Dec. 11, 1937   2 Sheets-Sheet 2

Inventor:
Claude E. Parker,
By:
Parker, Carlson, Pitzner & Hubbard
Attorneys.

Patented Oct. 29, 1940

2,219,787

UNITED STATES PATENT OFFICE 2,219,787

COOK STOVE

Claude E. Parker, Chicago, Ill., assignor to Gas Products Corporation, Chicago, Ill., a corporation of Illinois Application December 11, 1937, Serial No. 179,321

9 Claims. (Cl. 126—41)

This invention pertains to cook stoves and more particularly to improvements upon the invention disclosed and claimed in my copending application Serial No. 94,825, filed August 7, 1936, now Patent No. 2,102,482, dated December 14, 1937.

The aforesaid application discloses a broiler mechanism operative to provide for a more effectual application of the heat of the burner to a cooking plate disposed below the burner by retarding the escape of the hot gases from the broiling compartment so as to maintain immediately above the food support a slowly rising body of highly heated gases radiating heat downwardly onto the food support. One object of the present invention is to provide an improved construction for obtaining this result.

In another aspect, the invention pertains to cook stoves of the type having an oven section with a lower broiling compartment and an upper or superimposed baking compartment; and it is another object of the invention to provide a stove of this type in which both broiling and baking operations may be carried on more effectually.

In stoves of the character now in common use, a single burner is employed for supplying heat to the broiling and baking compartments, this burner being located in the upper part of the broiling compartment and being arranged to apply heat downwardly therein so that when performing a broiling operation, the heat will be directed downwardly toward the food support. While the broiling operation is greatly facilitated by retarding the escape of the hot gases from the broiling compartment, as set forth in said copending application, when the upper baking oven is to be used, it is desirable that the heat of the burner be permitted to pass rapidly into the upper compartment. Accordingly, an important object of the present invention is to provide a cook stove of the superimposed oven type having means operable to retard the escape of the gases from the broiling compartment when a broiling operation is to be performed, and to permit the free and rapid passage of the gases into the baking oven when the latter is to be used.

A preferred embodiment of my invention is shown by way of illustration in the drawings, in which:

Figure 1 is a perspective view of a cook stove of the type having a lower broiling compartment and an upper baking compartment.

Fig. 1a is a fragmentary perspective view showing a detail of construction.

Fig. 2 is a fragmentary plan section on an enlarged scale taken approximately in the plane of line 2—2 of Fig. 1.

Fig. 7 is a fragmentary plan section on a small scale showing the operating mechanism employed in Fig. 5.

Figure 3:
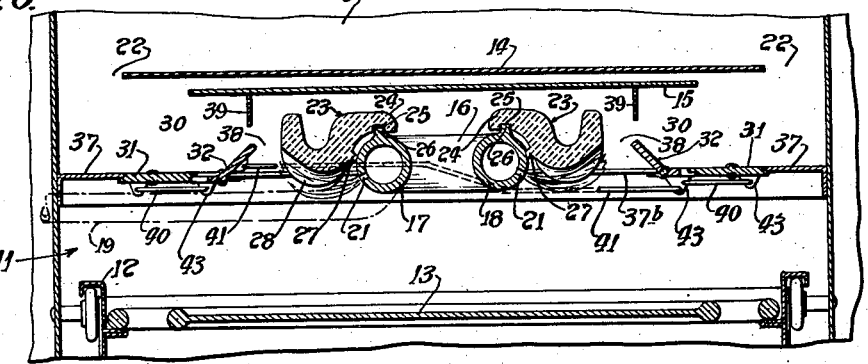
Fig. 3 is a fragmentary transverse sectional view taken approximately in the plane of line 3—3 of Fig. 2 and showing the parts in the position occupied during the broiling operation.

The stove selected for purposes of illustration is of the so-called table-top design. It comprises a cooking top section 7, and an oven section 8 having an upper baking compartment 9 closed by a door 10 and a lower broiling compartment 11 containing a drawer 12 equipped with a food support in the form of a solid plate 13. A horizontal partition divides the baking compartment 9 from the broiling compartment 11, and this partition comprises in the present instance, a plate 14 forming the bottom wall of the baking oven and, spaced a short distance below it, a second plate 15 providing a shallow air space between the two plates. The lower plate 15 may be of a width substantially less than the plate 14.

The plate 15 is suitably supported centrally of the oven section and spaced a short distance below it is a burner 16. This burner, in the form shown, is of the loop type (Fig. 2) providing opposed parallel legs 17 and 18 connected at their ends and supplied with gaseous fuel and primary air by a supply pipe 19 which is preferably located forwardly of the broiler compartment and extends laterally through a double walled partition 20 in a conventional manner.

Figure 4:
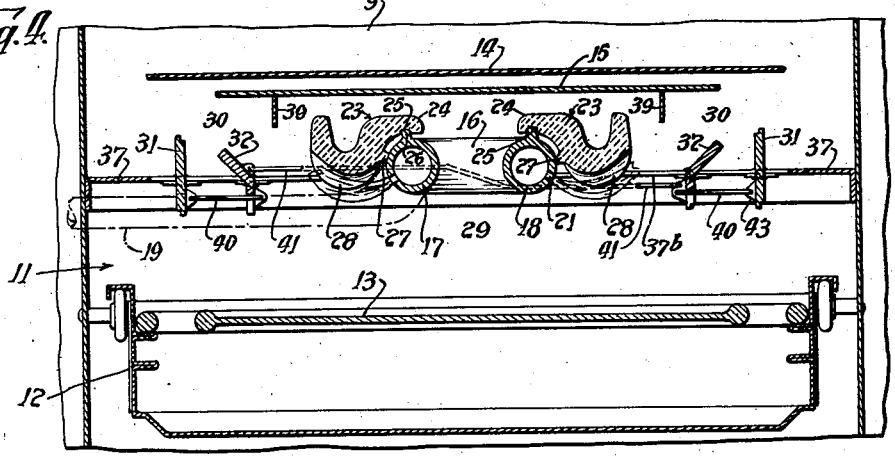
Fig. 4 is a similar view showing the parts in the position occupied when the stove is in use for baking purposes.

The burner 16 is disposed centrally in the upper part of the broiling compartment, which is commonly made 18 inches wide in the case of the larger ovens. The legs 17 and 18 of the burner are spaced a short distance apart, being approximately 1½ inches, inside clearance, in the case of an oven of the size indicated. Each leg is provided with outwardly and somewhat downwardly directed port holes 21 so as to direct the burner flames laterally outward as shown in Figs. 3 and 4.

The broiling and baking compartments communicate with each other through openings 22 formed in the present instance in the partition member 14 at opposite sides of the oven. These openings are of a size to permit the relatively free passage of hot gases from the lower or broiling compartment 11 into the upper or baking compartment 9. In practice these openings are preferably approximately 1½ inches in width and preferably extend in a front to rear direction the full depth of the stove (Fig. 2).

To increase the radiation of heat downwardly onto the food support, the burner may have supported thereon a pair of radiants 23 of ceramic material, as shown in Figs. 2, 3, 4 and 6. These radiants extend longitudinally of each of the burner legs 17 and 18 and overlie the flames of the burner which project laterally from the port holes 21. The radiants may partake of various forms but as herein shown are substantially U-shaped in cross-section, with one leg of the U extended inwardly as at 24 and provided with a groove 25 in its underside for engagement with a rib 26 formed on the burner. A rib 27 formed on the radiant bears against the burner. Thus the radiants are removably supported upon the burner and project laterally outward from the burner in overlying relation to the burner flames.

The under sides of the radiants are preferably provided with projecting teeth 28 through which the flames pass, lapping or scrubbing the teeth so as to heat the same to a state of incandescence. It will be observed that these radiants serve to spread the flames laterally outward and effectually radiate heat downwardly upon the food support.

For the purpose of maintaining between the burner and the food support a slowly rising body of highly heated gases, when the stove is in use as a broiler, I provide in association with the burner a baffle structure operative to retard the escape of gases from the broiler chamber and reduce the intake of secondary air substantially to that required to support combustion. As shown in Figs. 2, 3 and 4, the baffle structure serves to divide the upper portion of the broiling compartment transversely thereof so as to define a lower combustion space 29 and upper expansion spaces 30 on opposite sides of the broiler chamber. As herein shown the structure comprises a plurality of movable shutter elements movable between fixed or predetermined limit positions and adapted to occupy various positions depending upon the particular operation or operations to be performed. Thus for broiling purposes they occupy a position in which they coact with the burner and its associated parts to retard the escape of gases from the primary combustion space 29 into the expansion spaces 30. In another or "baking" position, they provide for the free passage of the hot gases to the outlet openings 22 leading to the upper baking compartment. In addition the shutter elements may if desired be moved into an intermediate position when both operations are to be carried on simultaneously.

While the baffle structure may take various forms, it is herein shown as comprising on each side of the burner a pair of elongated plates 31 and 32 supported at opposite ends upon trunnions 33 having suitable bearings at their front and rear ends. The front wall, in the present instance, includes a panel 36 between the oven-door 10 and the front of the drawer 12 (Fig. 1). In addition, the baffle structure comprises in the present instance outer fixed plates 37 and front and rear plates 37ᵃ and 37ᶜ respectively secured to the four falls of the oven structure.

It will be seen that the several plates coact to form a shutter. In the closed relation of the plates, they overlap slightly as shown in Fig. 3 and coact to form in effect a single partition having a central opening for receiving the burner and its radiants. The shutter plates may be of any suitable material, but preferably the plates 31 and 32 are made of cast iron in order to withstand intense heat. As shown, the inner plates 32 are somewhat V-shaped in form with the portions at opposite sides of the pivotal axis disposed in angular relation.

To permit of the operation of the plates 31 and 32 at the left of the chamber relative to the burner supply pipe 19, these plates are suitably notched as indicated at 31ᵃ and 32ᵃ (Fig. 2).

With the parts in the relation shown in Fig. 3, the baffle partition or wall is disposed substantially in the plane of the burner, with the inner edges of the inner shutter plates 32 terminating in a plane above the burner orifices and spaced a short distance from the outer sides of the radiants, thereby forming restricted outlet openings at opposite sides of the burner through which the hot gases are compelled to pass. In the case of an oven of the proportions above indicated, these openings are in the form of long narrow slots 38 approximately ⅝ of an inch wide formed between the inner edges of the shutter plates 31 and 32 and the outer sides of the radiants 23, it being observed that these radiants also constitute baffle elements forming part of the general baffle structure.

As will be seen by reference to Fig. 3, all of the gases incident to combustion, including the vapors arising from the food being cooked, must pass through the central outlet opening in the baffle before escaping from the primary combustion space 29 into the upper expansion spaces 30, and thence to the upper oven through the outlets 22. Also it will be seen that the arrangement is such that the hottest portions of the flames, namely, the invisible tips thereof, project into the outlet slots 38 so that the combustible gases and vapors in passing through the slots are subjected to the intense heat of the burner and effectually consumed.

Any gases passing upwardly centrally of the burner between the legs 17 and 18 thereof, impinge upon the partition plate 15, which thus constitutes a second baffle wall spaced above the partition wall. As the gases pass outwardly they are deflected downwardly by depending flanges 39 on the plate 15, which extend the full depth of the oven structure. These flanges are disposed outwardly of the radiants and form a dome overlying the burner operative to trap the hot gases and direct the same downwardly into the path of the highly heated gases escaping through the slots 38.

It will be seen that the baffle plates when in their closed relation (Fig. 3) cooperate with the burner and its radiants to retard effectually the escape of the gases of combustion from the lower or primary combustion space, thereby maintaining between the burner and the food support a slowly rising body of highly heated gases radiating heat downwardly on the food support in the manner fully set forth in the aforesaid application. In addition, the application of heat to the food support is substantially increased by the radiation of heat from the baffles and by the radiants themselves which by reason of their arrangement in overlying relation to the burner flames become heated to a state of incandescence.

When the stove is to be used for baking purposes, the shutter is opened, the plates being moved into the position shown in Fig. 4 so as to permit free passage of hot gases upwardly into the baking oven. For this purpose the shutter plates 31 and 32 on opposite sides of the burner are interconnected by means operable from the exterior of the stove. This means may be of any suitable or preferred character. As herein shown, each pair of shutter plates 31 and 32 are connected by a link 40, and the inner shutter plates 32 on opposite sides of the burner are connected by a link 41. The links may be in the form of simple rods having bent ends 42 projecting through apertured ears 43 cast integral with plates 31 and 32.

To operate the shutter plates the pivotal element of one of the plates, herein the inner plate 31 at the right hand side of the burner, is extended forwardly through the front panel 36 and provided with a suitable operating handle 44 which may be formed with a pointer to coact with suitable legends such as "Broil" and "Bake" on the front of the panel 36.

Because of the reverse character of the operation on opposite sides of the burner, the link 41 connecting the inner plates 32 is connected in the case of the left hand plate 32 to a point above the axis, and in the case of the corresponding plate at the opposite side of the burner, at a point below the axis. The operating linkage is disposed beneath the front ends of the shutter plates except in the case of a portion of the link 41 which passes through a small slot 41ᵃ.

Figure 5:
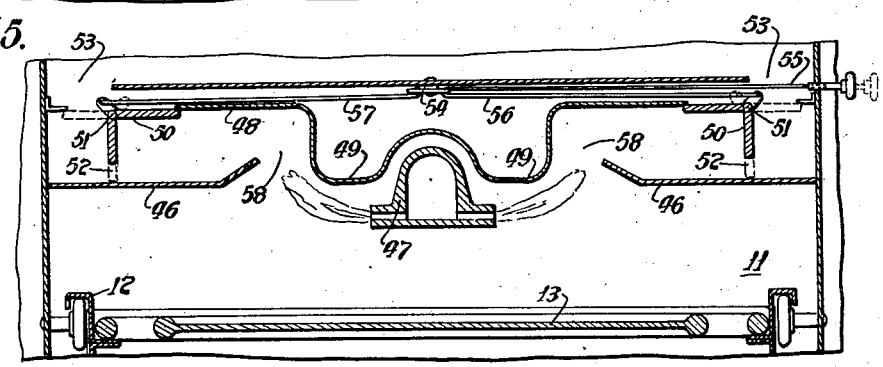
Fig. 5 is a fragmentary sectional view showing a modified construction.
Figure 6:
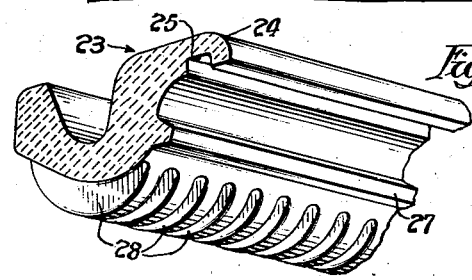
Fig. 6 is a fragmentary perspective view of a section of a radiant of ceramic material employed in association with the burner.

In the embodiment of my invention, shown in Figs. 5 and 7, the baffle structure comprises fixed baffle plates 46 extending inwardly from opposite side walls of the broiler chamber substantially in the plane of the burner. The latter, in this instance, is in the form of a single tubular member 47 having port holes arranged to project flames laterally in a central opening defined between the plates 46 overlying the burner. An upper baffle plate 48 formed of sheet metal, is shaped to provide depending flame spreaders 49 overlying the flames of the burner.

Coacting with opposite edges of the upper plate 48 are a pair of angular members 50 pivoted at 51 so as to form in effect a dome overlying the baffle plates 46. In the position shown in Fig. 5, the members 50 have depending portions coacting with the baffle plates 46 to form narrow passages 52, said depending portions being also spaced from the side walls of the oven to provide for the passage of hot gases upwardly to openings 53 establishing communication between the lower broiling chamber and the upper baking oven.

The members 50 are adapted to be shifted into a position to permit the free passage of the hot gases upwardly into the baking oven. Any suitable means may be employed for this purpose. That herein shown (Fig. 7) comprises a lever 54 pivotally mounted upon the under side of the bottom wall of the oven, and having an operating rod 55 extending laterally to a point outside of the oven. Links 56 and 57 connect opposite ends of the lever 54 with the members 50 at opposite sides of the chamber. By moving the rod 55 the members 50 may be shifted from their full-line positions shown into the positions shown in broken lines.

When a broiling operation is to be performed, the plate 48 and members 50 coact to form a dome for trapping the hot gases arising through the opening formed between the baffle plates 46. The inner edges of these plates are spaced from the depending flame spreaders 49 to form relatively wide passages 58 but the escape of gases from the dome is retarded by the restricted outlet slots 52. On the other hand when a baking operation is to be performed the movable baffle members 50 are shifted into their broken-line positions whereby a free passage is provided for the escape of the gases to the outlet openings 53.

It will be seen that by the construction provided it is possible to adjust the stove for the performance of either broiling or baking operations as may be desired, by a simple manipulation of an operating handle located in a convenient position. When the handle is moved to the broiling position, the heat of the burner is effectually concentrated upon the food support below the burner through the maintenance of a slowly rising body of highly heated gases between the burner and the food support. On the other hand, when the operating handle is moved to the "bake" position, the heat of the burner is permitted to pass rapidly and freely upward from the lower compartment into the baking oven instead of being confined for application downwardly onto the cooking plate. If it be desired to perform baking and broiling operations simultaneously, the movable baffle elements may, of course, be shifted into an intermediate position.

An important advantage incident to my invention is the ability to maintain in the broiler chamber a sufficiently high temperature e. g. 500° F. for a substantial period of time before the thermostat commonly employed in the baking oven acts to reduce the flow of fuel. By retarding the flow of the hot gases to the upper baking oven, it is possible to prevent the passage of heat to the upper oven at a rate sufficient to cause the thermostat to restrict the flow of the gaseous fuel before the broiling operation has been completed.

I claim as my invention:

1. A cook stove comprising, in combination, an upper baking oven, a lower broiling chamber, a partition between said oven and said chamber having openings permitting the free passage of gases therethrough, a food support in said chamber, a burner overlying said food support for applying heat downwardly thereon, baffle plates extending transversely of the chamber and defining a central outlet opening from the chamber, and means coacting with said baffle plates to retard the escape of gases from the broiling chamber to the baking oven, said means comprising a dome between said partition and said baffle for receiving the gases of combustion arising through said central opening, said dome comprising a top plate between said partition and said baffle plates, and a pair of angular members pivotally mounted for movement relative to said top plate and adapted in one position to coact with said baffles to form a lower outlet from the dome and in another position to form relatively large openings at opposite sides of the top plate for the free passage of hot gases to the baking oven.

2. In a gaseous fuel stove, the combination of a walled enclosure having upright front, rear and side walls and providing upper and lower chambers, the upper chamber having a bottom wall with inlet openings adjacent opposite side walls, a lower baffle forming a transverse partition wall in the upper portion of the lower chamber having a central opening therein and entirely closing the upper portion of the chamber from the lower portion except for said central opening, a burner spaced inwardly from the side walls of the lower chamber and having fuel discharge means in a plane below said opening, and a second baffle above said partition wall shaped to form a dome operative to receive and trap temporarily the hot gases passing upwardly from the lower chamber through said central opening while permitting the gradual escape of the gases to the upper chamber through said side inlet openings, said second baffle embodying control means shiftable selectively into either of two limit positions, and said baffles cooperating with said control means in one of said limit positions to concentrate the heat of the burner in the lower chamber while permitting the slow escape of the gases into the upper chamber at a rate sufficient to permit the induction of secondary air sufficient to support combustion, and when the control means is in the other limit position to permit the rapid passage of the gases to the upper chamber through said side inlet openings.

3. In a gaseous fuel stove, the combination of a walled enclosure having upright front, rear and side walls and providing upper and lower chambers, the upper chamber having lower inlet openings adjacent opposite side walls, a lower baffle forming a transverse partition wall in the upper portion of the lower chamber having a central opening therein and entirely closing the upper portion of the chamber from the lower portion except for said central opening, a burner spaced inwardly from the side walls of the lower chamber and having fuel discharge means in a plane below said opening, and a second baffle above said partition wall shaped to form a dome operative to receive and trap temporarily the hot gases passing upwardly from the lower chamber through said central opening while permitting the gradual escape of the gases to the upper chamber through said side inlet openings, one of said baffles embodying control elements shiftable selectively into either of two limit positions, and said baffles cooperating when the control elements are in one of said limit positions to provide an outlet passage dimensioned to cause the escape of the gases incident to combustion substantially at a rate sufficient only to permit the induction of secondary air necessary to support combustion, whereby to maintain in the lower chamber a slowly rising body of highly heated gases, and when the control elements are in the other limit position to permit the rapid passage of the gases to the upper chamber through said side inlet openings.

4. In a gaseous fuel stove, the combination of a walled enclosure providing upper and lower chambers, the upper chamber having lower side inlet openings for the passage of hot gases, a burner in the lower chamber, a lower baffle wall having a central opening therein and entirely closing the upper portion of the lower chamber from the lower portion thereof except for said central opening, and an upper baffle wall cooperating with the lower baffle wall to define a secondary combustion space communicating with the lower chamber through said central opening and with the upper chamber through said inlet openings, one of said walls having movable control elements associated therewith and shiftable relative thereto into either of two limit positions, and said baffle walls cooperating when the control elements are in one of said limit positions to concentrate the heat of the burner in the lower chamber while permitting the slow escape of the gases into the upper chamber at a rate sufficient to permit the induction of secondary air sufficient to support combustion, and when the control elements are in the other limit position to permit a relatively rapid passage of the gases to the upper chamber through said side inlet openings.

5. In a gaseous fuel stove, the combination of a walled enclosure having upright front, rear and side walls and providing upper and lower chambers, the upper chamber having a bottom wall and having inlet openings adjacent opposite side walls, a burner in the lower chamber spaced inwardly from the side walls thereof, and baffle means in the upper portion of the lower chamber including a lower baffle having a central opening therein and entirely closing the upper portion of the chamber from the lower portion except for said central opening, and an upper baffle cooperating with the lower baffle to define a secondary combustion space communicating with the lower chamber through said central opening and with the upper chamber through said side inlet openings, said lower baffle embodying movable control elements shiftable into either of two limit positions, said baffles cooperating when the control elements are in one of said limit positions to provide an escape passage proportioned to cause a slow escape of the gases incident to combustion whereby to maintain in the lower chamber a slowly rising body of highly heated gases, and when the control elements are in the other limit position to permit the rapid passage of the gases to the upper chamber through said side inlet openings.

6. A gaseous fuel cook stove comprising, in combination, a baking oven, a broiling chamber beneath said oven, capacious passages providing communication between said chamber and oven for the flow of hot gases, a food support in said chamber, a burner positioned in said chamber above said food support and having gas discharge orifices, and means for variably controlling the heat from said burner to optionally concentrate the heat upon the food support in the broiling chamber or to direct the heat into the baking oven, said means comprising a wall structure extending across the broiling chamber and including a stationary portion above said gas discharge orifices and a portion shiftable to a plurality of positions, said shiftable portion being operative in one of said positions to define a restricted outlet causing the flow of hot gases to said passages from the broiling chamber to the baking oven to be retarded substantially to a rate sufficient only to permit the induction of secondary air necessary to support combustion thereby concentrating the heat from said burner downwardly upon said food support, in another of which positions the unrestricted flow of hot gases through said passages from the broiling chamber to the baking oven will be permitted so as to effect rapid heating of the baking oven, and in a position intermediate the two aforesaid positions the flow of hot gases through said passages from the broiling chamber to the baking oven will be partially restricted so as to effect to an intermediate degree the concentration of heat on said food support in the broiling chamber and the rapidity of heating of the baking oven.

7. In a gaseous fuel cook stove, a walled enclosure having upright side walls and providing an upper baking oven and a lower broiling chamber in superimposed relation, a food support in said lower chamber, a burner above the food support, and a transverse wall structure in said enclosure comprising a horizontal partition having a central outlet opening and cooperating with said side walls to close the broiling chamber transversely thereof except for said central opening, said burner having fuel discharge means for projecting flames laterally substantially in the plane of said central outlet opening, baffle means extending horizontally above said central opening and defining with the partition a laterally extending passage establishing communication between said chamber and said baking oven, and a regulating mechanism operatively associated with said baffle means for controlling the flow of said gases including shiftable means having two limit positions and adapted when in one of said positions to form a restricted outlet causing the gases to flow from the lower chamber to the upper oven substantially at a rate sufficient only to permit the induction of secondary air necessary to support combustion, thereby concentrating the heat from the burner in the broiling chamber, and when in the other of said limit positions to cause a relatively free flow of hot gases from the lower chamber to the baking oven whereby to effect a rapid heating of the baking oven.

8. A gaseous fuel cook stove comprising, in combination, an upper baking oven and an underlying broiling oven having communicating passages only along opposite side walls thereof, a burner in said broiling oven, baffle means forming a secondary combustion space in the upper portion of said broiling oven immediately beneath said baking oven and overlying said burner and providing an opening only at the central portion through which hot gases may pass from the broiling oven into said space and therethrough into said baking oven, and a plurality of shiftable baffle elements selectively movable into either of two limit positions and being disposed in association with said secondary combustion space to serve when in one limit position to permit a free flow of the hot gases from the broiling oven to the baking oven to heat the latter with maximum rapidity, and when in another limit position to partially obstruct or retard the flow of such gases and to direct such flow in a sinuous path through said space and thereby concentrate the heat from the burner in said broiling oven.

9. A gaseous fuel cook stove comprising, in combination, a walled enclosure providing an upper baking oven and an underlying broiling oven with passages at the lower side corners of said baking oven connecting the two ovens and permitting the flow of hot gases from the broiling oven to the baking oven, a burner in said broiling oven, a stationary baffle wall having a central opening therein and entirely closing the upper portion of said broiling oven from the lower portion thereof except for said central opening and thereby providing in said upper portion a secondary combustion space directly beneath the baking oven and communicating therewith through said passages, and variable control means including a plurality of shiftable elements positioned in said upper portion of the broiling oven to act upon the gases passing through said space and movable selectively into either of two limit positions, said elements when in one of said limit positions cooperating with said stationary baffle wall to retard the flow of such hot gases through said space and concentrate the heat from said burner in the broiling chamber and acting when in the other of said limit positions to permit a relatively free and rapid passage of the gases through the space and into said baking oven.

CLAUDE E. PARKER.